Patented Jan. 17, 1939

2,143,989

UNITED STATES PATENT OFFICE 2,143,989

PROCESS FOR THE TREATMENT OF ABIETYL COMPOUNDS AND PRODUCTS PRODUCED THEREBY

Edwin R. Littmann, Wilmington, Del., assignor to Hercules Powder Company, Wilmington, Del., a corporation of Delaware No Drawing. Original application June 12, 1936, Serial No. 84,877. Divided and this application September 9, 1936, Serial No. 100,042

19 Claims. (Cl. 260—100)

This invention relates to a process for the treatment of rosin, rosin acids, and compounds derived from rosin which contain the hydrocarbon nucleus characteristic of rosin acids, and to the products thereof. More specifically, this invention relates to the treatment of such compounds, so as to decrease their unsaturated characteristics, and to the products resulting from such treatment.

This treatment in accordance with this invention comprises essentially contacting rosin, a rosin acid, or other compound containing the hydrocarbon nucleus of a rosin acid with a catalyst of the type hereinafter described, in a manner to exclude the possibility of reaction between the rosin or rosin derivative and any added material capable of reducing the unsaturation of the rosin acid nucleus. As a result of such treatment a change in the chemical and physical properties of the rosin or rosin derivative takes place, and the resultant product will be found to have a greatly decreased unsaturation. In many cases, the product will also be found to have a higher melting point and improved properties. These changes in the physical and chemical characteristics of the material are believed to be due to an intra- and inter-molecular rearrangement of the hydrogen atoms occurring therein, with no change in the carbon skeleton.

The catalysts which may be used in effecting this change are those which catalyze the hydrogenation of unsaturated organic compounds, as, for example, nickel, copper chromite, platinum, palladium, etc. While both base and noble metal hydrogenation catalysts are useful in producing this change or intra- and inter-molecular rearrangement, a catalyst of noble metal supported on an inert carrier is particularly effective. Palladium in an amount within the range of about 1% to about 25% supported on an inert carrier, such as, for example, granular alumina or fibrous asbestos, is preferred.

A novel type of palladium catalyst, devised especially for the process in accordance with this invention, may be made as follows:

A solution containing 1 part by weight of palladium chloride, 2 parts by weight of concentrated hydrochloric acid and 8 parts by weight of water is adsorbed on 15 parts by weight of granular alumina. This mixture is then treated with 2 parts by weight of an approximately 37% formaldehyde solution, followed with approximately 15 parts by weight of an approximately 10% sodium hydroxide solution, enough to make the solution slightly alkaline and precipitate the palladium black. After thorough agitation, the mixture is filtered, washed with water, dilute acetic acid, and then again with water, until neutral. The product is then finally dried in an oven at 80° C. to 100° C. This catalyst is most efficient in the treatment in accordance with this invention and its use is preferred.

Rosin is a mixture of isomeric rosin acids having the formula $C_{19}H_{29}COOH$, in which the group $C_{19}H_{29}$ has been shown to contain two double bonds and to possess an alkylated phenanthrene nucleus. It will be understood that when reference is made herein to a rosin acid, a carboxylic acid found in rosin and containing the group $C_{19}H_{29}$, is meant. More than fifty different isomeric rosin acids have been reported in the literature. The best known of these acids are abietic acid, sapinic acid and d-pimaric acid. The relative proportions in which these and the other isomeric rosin acids occur in a given sample of rosin depends on the source of the rosin. Thus, wood rosin contains more abietic acid than any of the other acids, while American gum rosin contains more sapinic acid. French gum rosin contains more d-pimaric acid.

The hydrocarbon nucleus of each of these isomeric acids is capable of reaction in accordance with this invention, and for the purposes of this invention they are entirely equivalent. Thus, for example, any of the various grades of American wood rosin, American gum rosin, French gum rosin, Portugese gum rosin, Spanish gum rosin, etc., may be treated to reduce their unsaturated characteristic. The several isomeric acids found in various types of rosin, for example, abietic acid, d-pimaric acid, sapinic acid, etc., may be separated and treated in purified form if desired. Likewise, compounds derived from rosin or the rosin acids without alteration of the $C_{19}H_{29}$ nucleus are equivalent to the rosin or rosin acids for the purposes of this invention. Further, partially hydrogenated rosins and compounds containing a partially hydrogenated hydrocarbon nucleus of a rosin acid are still further reduced in unsaturation when treated by the process in accordance with this invention and are likewise equivalent to the unhydrogenated compounds from the standpoint of this invention. Such compounds are characterized by containing somewhere in their structure the hydrocarbon group $C_{19}H_{31}$ containing one double bond, and are present in any hydrogenated rosin or rosin acid, less than 100% saturated with hydrogen, to an extent determined largely by the degree of saturation.

The class of compounds which may be treated in accordance with the process of this invention to decrease their unsaturation and improve their properties are characterized by containing somewhere in their structure an alkylated phenanthrene group containing two double bonds and having the formula $C_{19}H_{29}$ or a partially hydrogenated phenanthrene group containing one double bond and having the formula $C_{19}H_{31}$. No generic term has developed in the literature to cover this closely related group of compounds, so for convenience I will term them "rosinyl compounds". The term "rosinyl compound" will hereinafter be understood to include the abietyl compounds, the similar groups of compounds derived from rosin acids isomeric with abietic acid, partially hydrogenated abietyl compounds, and the similar partially hydrogenated compounds derived from rosin acids isomeric with abietic acid. This term is not intended to include rosins or compounds derived from rosins which have been hydrogenated sufficiently to remove both double bonds or to include compounds derived from rosin by a process which materially alters the hydrocarbon skeleton of the rosin acid.

In addition to the various rosins, rosin acids, partially hydrogenated rosins, and partially hydrogenated rosin acids mentioned hereinbefore, there are many other "rosinyl compounds" which may be treated in accordance with this invention. Thus, for example, I may treat the monohydric and polyhydric alcohol esters of rosins, rosin acids, partially hydrogenated rosins, or partially hydrogenated rosin acids, such as, for example, their esters with methanol, ethanol, propanol, iso-propanol, butanol, iso-butanol, oleyl alcohol, lauryl alcohol, abietyl alcohol, hydroabietyl alcohol, furfuryl alcohol, tetra-hydrofurfuryl alcohol, ethylene glycol, diethylene glycol, triethylene glycol, glycerol, erytheritol, pentaertheral, sorbitol, mannitol, mixtures thereof, phenol, etc. I may treat alcohols produced from rosins and rosin acids, partially hydrogenated rosins, or partially hydrogenated rosin acids, by the reduction of the carboxyl groups of the rosin acids, such as, for example, abietyl alcohol, dihydroabietyl alcohol, sapinyl alcohol, dihydrosapinyl alcohol, pimaryl alcohol, dihydropimaryl alcohol, etc. Again, I may treat ethers formed by the etherification of the alcohols derived from rosins, rosin acids, partially hydrogenated rosins, and partially hydrogenated rosin acids with aliphatic, aromatic, or hydroaromatic alcohols, such as, for example, abietyl methyl ether, abietyl ethyl ether, abietyl butyl ether, abietyl phenyl ether, abietyl bornyl ether, abietyl terpinyl ether, pimaryl methyl ether, pimaryl ethyl ether, pimaryl propyl ether, pimaryl phenyl ether, pimaryl bornyl ether, pimaryl terpinyl ether, sapinyl methyl ether, sapinyl ethyl ether, sapinyl propyl ether, sapinyl butyl ether, sapinyl phenyl ether, sapinyl bornyl ether, sapinyl terpinyl ether, etc. Likewise, I may treat hydrocarbons produced by the decarboxylation of rosins, rosin acids, partially hydrogenated rosins, partially hydrogenated rosin acids, etc., such as, for example, those produced by the treatment of rosins, rosin acids, partially hydrogenated rosins and partially hydrogenated rosin acids with a catalyst, as, p-toluene sulphonic acid, at an elevated temperature, according to the process disclosed in U. S. Patent 1,975,211, to Alan C. Johnston, or by treatment with fuller's earth at an elevated temperature.

Compounds which contain in their structure a rosin acid nucleus or partially hydrogenated rosin acid nucleus which has undergone the intra- and inter-molecular rearrangement produced by the process in accordance with this invention, will hereinafter be referred to as "Hyex" compounds. The catalytic reaction by which the unsaturation of the rosin acid nucleus or the partially hydrogenated rosin acid nucleus is reduced will be termed the "Hyex reaction".

In carrying out the process in accordance with this invention, the "rosinyl compound" will be brought into contact with a hydrogenation catalyst, preferably at an elevated temperature in order that a practical reaction rate may be obtained; however, the use of an elevated temperature is not necessary for the accomplishment of the desired result. The optimum temperature range for most satisfactory results is from about 150° C. to about 250° C., and a temperature of about 220° C. to about 250° C. is preferred. Pressure has little or no effect on the reaction, which may be carried out in vacuo or at superatmospheric pressure if desired. Since atmospheric pressure is most convenient from an apparatus standpoint, such will usually be used.

As thorough contact between catalyst and rosin or rosin acid can best be obtained when the rosinyl compound or partially hydrogenated "rosinyl compound" is in liquid or vapor phase, the rosinyl compound or partially hydrogenated "rosinyl" compound will preferably be heated to render it sufficiently fluid for desired contact with the catalyst. While, under certain circumstances it is desirable to carry out the reaction in the vapor phase, ordinarily I prefer to carry it out with a liquid phase. The "rosinyl compound" or the partially hydrogenated "rosinyl compound" may be in the molten condition or may, if desired, be dissolved in a suitable inert, non-reactive solvent, and the solution so formed treated with a hydrogenation catalyst. Any solvent for the compound treated which is not a poison to a hydrogenation catalyst and which does not contain catalyst poisons as impurities and which does not enter into the "Hyex reaction" is suitable for this purpose. Thus, for example, aliphatic hydrocarbons, the various petroleum fractions, monocyclic aromatic hydrocarbons, hydrogenated aromatic hydrocarbons, etc., are suitable for the purpose. The aliphatic hydrocarbons and the various petroleum fractions are particularly useful.

In accordance with this invention it is essential that the treatment of the "rosinyl compound" be carried out in such a manner that no reaction can occur between the compound being treated and any added material capable of reducing its unsaturation under the conditions of reaction. In other words, any material which, under the conditions of treatment, will react with the "rosinyl compound" to reduce its unsaturation must be excluded. No added hydrogen is present during the treatment. However, inert substances and substances capable of reaction with the compound which do not reduce its unsaturation, may be present. Thus, inert solvents, inert gases, etc. may be present. While the treatment may be carried out in the presence of air, it is preferable to treat the "rosinyl compound" or the partially hydrogenated "rosinyl" compound in an atmosphere of a more inert gas, as, for example, carbon dioxide, nitrogen, etc.

The treatment in accordance with this invention may be carried out simultaneously with other reactions, which do not involve a change in the unsaturated characteristic of the rosin nucleus. Thus, rosin or a rosin acid may be treated with a hydrogenation catalyst to produce an intra- and inter-molecular rearrangement of the nucleus and, for example, simultaneously esterified with an alcohol, to produce a rosin ester of reduced unsaturation.

Contact between the "rosinyl compound" or the partially hydrogenated "rosinyl compound" and the catalyst should be maintained for from a few seconds to 5 hours or more, depending upon the temperature and upon the amount and activity of the catalyst employed. Upon the completion of the treatment, the resultant product may be easily separated from the catalyst by filtration. The product secured after the removal of the catalyst, if volatile, may if desired, be distilled under reduced pressure and separated into two or more fractions. Where a high melting point product is desired, such may be secured by the removal of the low-boiling fraction from the catalytically-treated material.

The product, in accordance with this invention, may be produced by one or more of the three alternate embodiments of the method in accordance with this invention. By the first of these alternate embodiments the corresponding "rosinyl compounds" may be treated, either alone or in solution, with a suitable catalyst to produce the "Hyex reaction", as described hereinbefore. This embodiment will be most advantageous for the treatment of rosin compounds which are free from impurities which will poison the catalyst, or which are not of such nature that they act as catalyst poisons. Thus, rosin may be contacted with a catalyst to produce a "Hyex" rosin, or a rosin ester may be passed over a catalyst to produce "Hyex" rosin ester.

By a second embodiment of the method in accordance with this invention a "rosinyl compound" may be treated with a suitable catalyst to produce the "Hyex reaction", and simultaneously reacted, either alone or in the presence of a solvent, with some other material which is incapable of affecting the unsaturation of the rosin acid or partially hydrogenated rosin acid nucleus or of poisoning the hydrogenation catalyst. Thus, a mixture of wood rosin and methanol may be treated with a suitable catalyst at an elevated temperature and pressure to produce a "Hyex" methyl abietate, which is identical in properties with the product secured by subjecting methyl abietate to the "Hyex reaction".

By a third embodiment of the method in accordance with this invention a "rosinyl compound" may be treated, either alone or in solution, with a suitable catalyst to produce the "Hyex reaction" and the product so formed reacted with another material to produce the desired product. Thus, for example, any of the different rosins may be contacted with a suitable catalyst, as hereinbefore described, to produce a "Hyex" rosin, and then esterified by reaction with an alcohol to produce the "Hyex" rosin ester and the "Hyex" rosin ester so produced will be identical in properties with the "Hyex" rosin ester produced according to the first or second embodiments of my invention.

A wide variety of "Hyex" compounds may be prepared by this embodiment of my invention. Thus, any one of the rosins, rosin acids or partially hydrogenated rosins mentioned above may be subjected to the "Hyex reaction", and then decarboxylated as, for example, by heating in contact with fuller's earth or a sulphonic acid catalyst to produce a "Hyex" rosin oil. A rosin or rosin ester may be subjected to "Hyex treatment" and then reduced to the corresponding alcohol, as for example, by hydrogenation of the acid, or reduction of the ester with sodium and alcohol. The alcohol so produced may then be etherified with another alcohol, such as, for example, one of the aliphatic, aromatic, or hydroaromatic alcohols mentioned hereinbefore. Alternately, a rosin acid may be reduced to the corresponding alcohol, as for example, by catalytic treatment with hydrogen and the product subjected to the "Hyex reaction" and then etherified.

This third embodiment of my invention is particularly useful for the production of "Hyex" compounds which cannot be easily produced by the first or second alternative methods, due to the corresponding rosinyl compound or partially hydrogenated rosinyl compound being of a nature such that it acts as a poison to the catalyst in the "Hyex reaction". Thus, for example, many of the metal salts of rosin acids or partially hydrogenated rosin acids have a tendency to poison the catalyst or to contain catalyst poisons unless proper precautionary measures are taken and, hence, cause difficulty in the "Hyex reaction". "Hyex" rosin salts, however, may be readily prepared by subjecting a rosin acid or a partially hydrogenated rosin acid to the "Hyex reaction" and then forming the salt of the "Hyex" rosin acid produced. Thus, any one of the rosins, rosin acids, or partially hydrogenated rosins mentioned above may be subjected to the Hyex reaction and then reacted with a metal hydroxide or other metal compound, capable of forming a metal salt with the "Hyex" rosin acid. Thus, the "Hyex" rosin acid may be reacted with an alkali metal hydroxide, for example, sodium or potassium hydroxide, to produce the corresponding alkali metal salt of the "Hyex" rosin with a heavy metal oxide or hydroxide, as for example, lead cobalt, or manganese hydroxide, to produce the corresponding heavy metal salts.

The product in accordance with this invention, is a compound which contains somewhere in its structure a hydrocarbon group derived from an isomeric rosin acid, which has undergone what appears to be an intra- and inter-molecular rearrangement to eliminate its unsaturation as measured by the Wijis iodine value or the thiocyanate value. Such compounds may, for example, be of one of the following types: carboxylic acid, ester, alcohol, ether, hydrocarbon, metallic salt etc. These compounds will be found to resemble, in general physical appearance, the compounds which have not been treated by the method in accordance with this invention, although frequently they are lighter in color and have a higher melting point than the corresponding untreated product. Chemically the treated and untreated compounds are identical with respect to the functional group, but different in regard to their chemical unsaturation.

Due to the substantially saturated character of the products prepared in accordance with this invention, their use will be found to be highly advantageous in many products in which untreated rosinyl compounds are now used. Thus, "Hyex" rosin, "Hyex" rosin acids, "Hyex" rosin ethers, etc., will be found advantageous for use in paints, varnishes and lacquers, in place of the corresponding "rosinyl compounds" which have been used before. The "Hyex" rosin oils, because of their stability to oxidation, will be found useful as thread lubricants in spinning operations, as high boiling solvents for gums and resins, and as ingredients in greases. The alkali metal salts of the "Hyex" rosins are useful as paper size and soaps, and are advantageous in this use due to their resistance to chemical oxidation and as intermediates for additional syntheses. The heavy metal salts of Hyex rosin, such as, for example, those containing manganese, cobalt, zinc, lead, etc., are particularly useful as driers in paints and varnishes, since solutions containing such driers remain bright and of constant drying strength on aging.

The carboxylic acids included within the scope of this invention are the isomeric rosin acids, or commercial mixtures thereof in the various types of rosins, mentioned hereinbefore, which have been subjected to the "Hyex treatment". The esters, in accordance with this invention, are compounds having the following formula: R—COO—A in which R is a hydrocarbon nucleus of one of the isomeric rosin acids, which has been subjected to the "Hyex treatment" either before, during, or after the esterification reaction and A is a group derived from an alcohol. The ethers, in accordance with this invention, are compounds having the following formula: R—$CH_2$—O—A in which the R and A have the same meaning as in the formula given for the esters. The hydrocarbons, in accordance with this invention, are the hydrocarbon nuclei of the isomeric rosin acids which have been subjected to the "Hyex treatment" and from which the carboxyl group has been removed. Such "Hyex rosinyl" hydrocarbons may be produced by subjecting rosin or a rosin acid to the "Hyex treatment" and then treating the resulting "Hyex" rosin or "Hyex" rosin acid to remove the carboxyl group. Alternately, the rosin or rosin acid may be decarboxylated, by treatment with a sulfonic acid catalyst or any other reagent known to produce the decarboxylation of rosin, and the resulting hydrocarbon then subjected to the "Hyex treatment". The salts, in accordance with this invention, are metal salts of a "Hyex" rosin or "Hyex" rosin acid. Such salts will desirably be produced by subjecting the rosin or rosin acid to the "Hyex treatment" and then forming the salt by reaction with a suitable metal compound, such as, for example, the metal hydroxide. Alternately, but less desirable, the rosin or rosin acid may be treated with a suitable metal compound to form the salt, and this salt then subjected to the "Hyex treatment".

The following table shows comparative values of various chemical constants for rosin which has been subjected to the "Hyex reaction" together with those of the corresponding untreated rosin.

TABLE I

| | "I" wood rosin (before treatment) | Hyex "I" wood rosin |
|---|---|---|
| Thiocyanate No | 90–96 | 10–14. |
| Melting point (drop) | 80°–85° C. | 85°–90° C. |
| Color | | Very slight bleaching produced by reaction. |
| Saponification No | 168–172 | 167–171. |
| Oxygen adsorption: Percent of total adsorbed by two double bonds. | 40% | 1% |

The decrease in thiocyanate number and in oxygen adsorption exhibited by the treated "I" wood rosin is proof of the marked decrease in chemical unsaturation produced by treatment in accordance with this invention. The fact that the saponification number is practically the same for both the treated and untreated rosins demonstrates that the carboxyl groups of the rosin acids have been unchanged by the treatment, which must therefore affect the hydrocarbon nucleus only.

The following table shows comparative values of various chemical constants for a treated, together with those of the corresponding untreated, rosin acid.

TABLE II

| | Abietic acid (before treatment) | "Hyex" abietic acid |
|---|---|---|
| Thiocyanate No | 90–93 | 15–55 |
| Melting point | 145°–150° C. | 160°–165° C. |
| Color (when melted) | Pale straw | Practically colorless |
| Oxygen adsorption: Percent of total adsorbed by two double bonds | 55% | None |

Here, as in the case of "I" rosin, the lowered thiocyanate number and oxygen adsorption demonstrate the saturated character of the treated abietic acid.

Illustration of the process and products in accordance with the first of the three alternate embodiments of the method of this invention, is given by Examples 1–3, inclusive, which follow:

EXAMPLE I

*Preparation of "Hyex" rosins and "Hyex" rosin acids*

Samples of French gum rosin, dihydroabietic acid (50% saturation), recrystallized dihydroabietic acid (50% saturation), "FF" grade wood rosin, and "G" grade American gum rosin, respectively, were contacted with a catalyst of palladium supported on alumina, which was prepared as described hereinbefore, for a period of one hour at a temperature of 230° C., under conditions such that no compound capable of reducing unsaturation came in contact with the rosin treated. The physical and chemical characteristics of each of these rosins were altered by this treatment, as shown by the comparison of the properties of the treated and untreated samples given in the following table:

TABLE III

*Analyses of "Hyex" rosin*

| Rosin treated | Thiocyanate No. | | Melting point (drop) | | Specific rotation | |
|---|---|---|---|---|---|---|
| | Untreated | Treated | Untreated | Treated | Untreated | Treated |
| French gum rosin | 100 | 24 | 92° C. | 99° C. | 15.9 | Cryst. |
| Dihydroabietic acid (50% sat.) | 40 | 5 | 77 | 87 | 27.3 | 53.5 |
| Dihydroabietic acid (recryst.) | 21 | 4 | | 89 | 43.2 | 51.1 |
| "FF" wood rosin | 99 | 80 | 86 | 83 | | |
| "G" American gum rosin | 94 | 8 | 90 | 95 | | |

These data demonstrate that the treatment of each of the rosins and rosin acids listed, by the process in accordance with this invention, makes substantial reduction in their unsaturation, as shown by the decrease in the thiocyanate number, and substantially increases the melting point.

EXAMPLE II

*Preparation of "Hyex" wood rosin in solution*

A mixture of 25 parts by weight of "I" wood rosin, 10 parts by weight of the palladium catalyst supported on granular alumina described hereinbefore, and 25 parts by weight of decane was placed in a bomb and heated to a temperature of 235° C. and a pressure of 75 lbs. per sq. in. for one hour. At the end of this period, the product was filtered and the treated rosin recovered from the decane solution by evaporating the decane under atmospheric and finally under reduced pressure. Comparative analyses of this product and of the original "I" wood rosin are given in Table IV.

TABLE IV

| | "I" wood rosin (untreated) | Treated "I" wood rosin |
|---|---|---|
| Thiocyanate value | 93 | 16 |
| Acid number | 169 | 159 |

The data given in the above table demonstrate that the treatment of a solution of "I" wood rosin in decane, in accordance with this invention, produces a marked decrease in the unsaturation of the "I" wood rosin, as measured by the thiocyanate value, with a relatively unimportant decrease in acidity, as measured by the acid number.

EXAMPLE III

*Preparation of "Hyex" methyl abietate*

Methyl abietate was contacted with the palladium supported on granular alumina described heretofore, at a temperature of 230° C. and for a period of 60 minutes. Table V gives a comparison of the properties of methyl abietate after this treatment with those of the original methyl abietate.

TABLE V

| | Methyl Abietate (before treatment) | "Hyex" Methyl Abietate |
|---|---|---|
| Thiocyanate No. | 94 | 4.1 |
| Physical condition at room temperature | Liquid | Pasty crystals |
| Color | Greenish-yellow | Colorless |
| Methoxyl (CH₃O-) content | 9.7% | 9.6% |

The comparisons shown in the above table demonstrate that the "Hyex treatment" has practically eliminated the unsaturation of the methyl abietate as measured by the thiocyanate value, increased its melting point, reduced its color, and had practically no effect on the extent of its esterification.

The following example in which "I" wood rosin is subjected simultaneously to the "Hyex reaction" and to esterification illustrates the second of the three alternate embodiments of this invention.

EXAMPLE IV

*Preparation of "Hyex" methyl abietate*

A mixture of 25 g. of "I" wood rosin, 10 g. of the palladium catalyst supported on granular alumina described hereinbefore, and 50 cc. of methanol were placed in an autoclave and heated at a temperature of 230–240° C. at a pressure of 100 pounds per sq. in. for a period of 1 hour. The reaction mixture was then filtered to remove the catalyst, and the excess methanol was removed by evaporation. The following table shows a comparison of the analyses of the product so obtained and that of the original "I" wood rosin.

TABLE VI

| | "I" wood rosin (untreated) | "Hyex" methyl abietate |
|---|---|---|
| Thiocyanate value | 93 | 56 |
| Acid number | 169 | 55 |
| Methoxy content | 0.2% | 6.3% |

These data demonstrate that the unsaturation of the rosin nucleus has been decreased approximately 40%, and that the acid number has been decreased approximately 67½% by esterification with the methyl alcohol, while the methoxy content indicates an esterification of approximately 65% on the basis of comparison with a theoretical methoxy value of 9.7% for a completely esterified methyl abietate.

Examples 5–11, inclusive, which follow, illustrate the third of the three alternate embodiments of the method in accordance with this invention.

EXAMPLE V

*Preparation of the stearyl ester of "Hyex" American gum rosin*

Thirty g. of "Hyex" American gum rosin similar to that described in Table III was admixed with 24 g. of stearyl alcohol. This mixture was then heated at a temperature of 200° C. in a current of carbon dioxide for a period of 20 hours. At the end of this time it was found that the acid number of the rosin had been decreased from approximately 93 to 59. The reaction mixture was then cooled, dissolved in ether, and washed free of rosin acid with a sodium hydroxide solution and the solvent evaporated. The crude material so obtained was a mixture of stearyl alcohol and the stearyl ester of "Hyex" American gum rosin, and gave the following analyses:

| | Per cent |
|---|---|
| Acid number | 1.5 |
| Hydroxyl content | 1.9 |
| Ester content | 70 |

This crude mixture was then freed from stearyl alcohol by heating at 200° C., and an absolute pressure of 2 m. until no further material could be distilled. The refined stearyl ester of "Hyex" American gum rosin so prepared is a soft wax at room temperature.

EXAMPLE VI

*Preparation of glycerol ester of "Hyex" American gum rosin*

A mixture of 12.5 parts of glycerol and 100 parts of "Hyex" American gum rosin similar to that described in Table III above was heated at 270° C. for a period of 6½ hours in an atmosphere of carbon dioxide. At the end of this period the excess glycerine was removed from the reaction mixture by reducing the pressure to 15 m. for ½ hour at a temperature of 270° C. The remaining ester was then cooled to 200° C. while still under vacuum, and then cooled further to room temperature under atmospheric pressure. The product gave the following analyses:

| | |
|---|---|
| Acid number | 5 |
| Melting point (drop method) | 96° C. |
| Color | 80 ampere 41 red |
| Grade (U. S. standard rosin types) | E |

EXAMPLE VII

*Preparation of glycerol ester of "Hyex" French gum rosin*

A mixture of 55 g. of the "Hyex" French gum rosin described in Table III and 7 g. of glycerin was heated to 270° C. for 7 hours in an atmosphere of carbon dioxide. During the last 30 minutes of heating, the carbon dioxide was bubbled through the reaction mixture to remove the excess glycerine. The product obtained was a hard resin having an acid number of 5.

EXAMPLE VIII

*Preparation of "Hyex" wood rosin oil*

Four hundred g. of the "Hyex" wood rosin described in Table I was heated to 285° C. with 1/10 of 1% by weight of paratoluene sulfonic acid. The temperature was then raised to 320° C., and maintained at this point for 4 hours. This treatment produced 390 g. of a crude rosin oil having an acid number of 58 as compared with an acid number of 160 for the original "Hyex" wood rosin. Substantially neutral oil was then produced by dissolving 150 g. of this crude oil in 200 g. of petroleum ether, washing this solution with an aqueous caustic soda solution, and evaporating the petroleum ether. Ninety-seven g. of an oil having the following analyses was obtained:

| | |
|---|---|
| Acid number | 1.0 |
| Refractive index at 20° C | 1.5475 |
| Thiocyanate value | 40.5 |

A second portion of the crude rosin oil was purified by an alternative procedure as follows:

Fifteen g. of sodium carbonate and 25 g. of water was added to 150 g. of the crude oil. When the reaction was complete the mixture was heated and the water evaporated. This product was then distilled under reduced pressure to give 80 g. of a pale rosin oil as a distillate. This pale rosin oil gave the following analyses:

| | |
|---|---|
| Acid number | 0.75 |
| Refractive index at 20° C | 1.5543 |
| Thiocyanate value | 31.5 |

EXAMPLE IX

*Preparation of "Hyex" gum rosin oil*

Crude rosin oil was prepared from a "Hyex" American gum rosin similar in properties to that described in Table III, by following the same procedure given in Example VIII for the preparation of the crude "Hyex" wood rosin oil. From 400 g. of the "Hyex" gum rosin there was obtained 375 g. of a crude rosin oil which gave the following analyses:

| | |
|---|---|
| Acid number | 9.0 |
| Refractive index at 20° C | 1.5543 |
| Thiocyanate value | 31.5 |

An essentially neutral rosin oil was obtained from this crude rosin oil by the following procedure: A mixture of 180 g. of the crude rosin oil in 200 g. of petroleum ether was washed with an excess of an aqueous solution of sodium hydroxide. The rosin oil was then recovered by separating the non-aqueous portion of the wash mixture and evaporating the solvent. The product was a substantially neutral "Hyex" American gum rosin oil which gave the following analyses:

| | |
|---|---|
| Acid number | 1.5 |
| Refractive index at 20° C | 1.5537 |
| Thiocyanate value | 28 |

A second method by which the crude "Hyex" gum rosin oil was purified was as follows: 180 g. of the crude rosin oil was distilled under reduced pressure from excess sodium carbonate to yield 128 g. of a pale colored "Hyex" American gum rosin oil which gave the following ananlyses:

| | |
|---|---|
| Acid number | 1.0 |
| Refractive index at 20° C | 1.5517 |
| Thiocyanate value | 28.0 |

EXAMPLE X

*Preparation of the sodium salt of "Hyex" wood rosin*

One hundred g. of the "Hyex" wood rosin described in Table I was heated to 100° C. To this molten resin there was added 80 cc. of a 20% solution of sodium carbonate in small portions and with constant agitation. During the entire operation the reaction mixture was kept boiling. The cooking was continued for 20 minutes after all the carbonate had been added. The reaction mixture was then diluted with hot water to a concentration of 20% sodium salt and finally to a concentration of 6% sodium salt. The product was a dilute aqueous solution of the sodium salt of "Hyex" wood rosin, suitable for use as a paper size.

EXAMPLE XI

*Preparation of "Hyex" rosin alcohols*

Rosin alcohols were prepared from "Hyex" American gum rosin, "Hyex" French gum rosin, and "Hyex" wood rosin, respectively, which had been prepared as described in Example I, by the following treatment: One hundred parts, by weight, of the "Hyex" rosin was mixed with 5 parts, by weight, of copper chromite catalyst and 40 parts, by weight, of ether. This mixture was heated in an autoclave with hydrogen at 1800–3000 pounds/sq. in. pressure and at 250–280° C.

for a period of 6-8 hours. After this treatment the product was recovered by evaporation of the ether, after the removal of the catalyst by filtration. The alcohols produced by this procedure had the following boiling ranges:

Alcohol from "Hyex" American gum rosin_____ 192°-228° C. at 3 mm.
Alcohol from "Hyex" French gum rosin_____ 190°-215° C. at 3 mm.
Alcohol from "Hyex" Wood rosin_____ 190°-215° C. at 3 mm.

While Example XI illustrates the conditions I prefer to use in the production of "Hyex" rosin alcohols, I may replace the copper chromite with any suitable hydrogenation catalyst, such as nickel copper, nickel chromate, zinc chromate, zinc chromite, or nickel chromite. The temperature may be varied within the range of about 150° C. and about 350° C. and the pressure within wide limits. If desired, esters of "Hyex" rosin may be substituted for the rosins themselves in the reductions. In either case it wil be found that alcohol concentrations of 75-90%, by weight, may be produced without difficulty.

The fact that the changes in a "rosinyl" compound caused by the "Hyex" treatment", in accordance with this invention, occur solely within the hydrocarbon nucleus derived from a rosin acid in the "rosinyl" compound treated, and that identical compounds can be produced by following the different embodiments of the method in accordance with this invention, is strikingly demonstrated by the following experiment:

Abietic acid was given the "Hyex treatment" in accordance with this invention to produce a "Hyex" abietic acid having the properties shown by the analyses given in Table II, above. This product was then esterified with methyl alcohol and the ester nitrated. The resultant crystalline nitrate melted at 185° C. Pure methyl abietate, made from untreated abietic acid was then given the "Hyex treatment" by the method in accordance with this invention as shown in Example III, above, and subsequently nitrated. This crystalline nitrate also melted at 185° C., and a mixture of this nitrate and the nitrate produced as described above melted sharply at 185° C. The two nitrates are thus proved to be chemically identical, which proves that the "Hyex treatment" in accordance with this invention, affects only the hydrocarbon nucleus of the "rosinyl compound."

It will be understood that the details and examples hereinbefore set forth are illustrative only, and that the invention as herein broadly described and claimed is in no way limited thereby.

It will be understood that the term "unsaturation" is used in this specification and in the appended claims to refer to the unsatisfied carbon valences of the type represented by a double bond in unsaturated aliphatic compounds and conveniently measured by the thiocyanate value.

This application is a division of my application for United States Letters Patent, Serial No. 84,877, filed June 12, 1936, which is in turn a continuation-in-part of my application for United States Letters Patent, Serial No. 6403, filed February 13, 1935.

What I claim and desire to protect by Letters Patent is:

1. A compound of the formula R—CH$_2$—O—A in which R is the hydrocarbon nucleus of an acid from the group consisting of rosins, rosin acids, partially hydrogenated rosins, and partially hydrogenated rosin acids, which has been treated with a hydrogenation catalyst in the absence of any added substance capable of reducing the unsaturation of the said hydrocarbon nucleus under the conditions of treatment, and A is a member of the group, consisting of aliphatic, aromatic and hydroaromatic radicals, the said compound being characterized by the fact that it has a lesser degree of unsaturation than that of a similar compound in which R is untreated.

2. A compound of the formula R—CH$_2$—O—A in which R is the hydrocarbon nucleus of a rosin which has been treated with a hydrogenation catalyst in the absence of any added substance capable of reducing the unsaturation of the said hydrocarbon nucleus under the conditions of treatment, and A is a member of the group consisting of aliphatic, aromatic and hydroaromatic radicals, the said compound being characterized by the fact that it has a lesser degree of unsaturation than that of a similar compound in which R is untreated.

3. A compound of the formula R—CH$_2$—O—A in which R is the hydrocarbon nucleus of a rosin which has been treated with a hydrogenation catalyst in the absence of any added substance capable of reducing the unsaturation of the said hydrocarbon nucleus under the conditions of treatment, and A is an aliphatic radical, the said compound being characterized by the fact that it has a lesser degree of unsaturation than that of a similar compound in which R is untreated.

4. A compound of the formula R—CH$_2$—O—A in which R is the hydrocarbon nucleus of abietic acid, which has been treated with a hydrogenation catalyst in the absence of any added substance capable of reducing the unsaturation of the said hydrocarbon nucleus under the conditions of treatment, and A is a member of the group consisting of aliphatic, aromatic and hydroaromatic radicals, the said compound being characterized by the fact that it has a lesser degree of unsaturation than that of a similar compound in which R is untreated.

5. A compound of the formula R—CH$_2$—O—A in which R is the hydrocarbon nucleus of pimaric acid, which has been treated with a hydrogenation catalyst in the absence of any added substance capable of reducing the unsaturation of the said hydrocarbon nucleus under the conditions of treatment, and A is a member of the group consisting of aliphatic, aromatic and hydroaromatic radicals, the said compound being characterized by the fact that it has a lesser degree of unsaturation than that of a similar compound in which R is untreated.

6. A compound of the formula R—CH$_2$—O—A in which R is the hydrocarbon nucleus of sapinic acid, which has been treated with a hydrogenation catalyst in the absence of any added substance capable of reducing the unsaturation of the said hydrocarbon nucleus under the conditions of treatment, and A is a member of the group consisting of aliphatic, aromatic, and hydroaromatic radicals, the said compound being characterized by the fact that it has a lesser degree of unsaturation than that of a similar compound in which R is untreated.

7. A compound of the formula R—CH$_2$—O—A in which R is the hydrocarbon nucleus of abietic acid, which has been treated with a hydrogenation catalyst in the absence of any added substance capable of reducing the unsaturation of the said hydrocarbon nucleus under the conditions of treatment, and A is an aliphatic radical, the said compound being characterized by the fact that it has a lesser degree of unsaturation than that of a similar compound in which R is untreated.

8. A compound of the formula R—CH$_2$—O—A in which R is the hydrocarbon nucleus of abietic acid, which has been treated with a hydrogenation catalyst in the absence of any added substance capable of reducing the unsaturation of the said hydrocarbon nucleus under the conditions of treatment, and A is a methyl radical, the said compound being characterized by the fact that it has a lesser degree of unsaturation than that of a similar compound in which R is untreated.

9. The method of treating a "rosinyl" ether which includes heating the rosinyl ether with a hydrogenation catalyst at a temperature within the range of about 150° C. to about 250° C. in the absence of added substances capable of reducing the unsaturation of the rosinyl ether.

10. The method of treating a "rosinyl" ether which includes contacting the rosinyl ether with a noble metal hydrogenation catalyst at a temperature within the range of about 150° C. to about 250° C. in the absence of added substances capable of reducing the unsaturation of the rosinyl ether.

11. The method of treating a "rosinyl" ether which includes contacting the rosinyl ether with a base metal hydrogenation catalyst at a temperature within the range of about 150° C. to about 250° C. in the absence of added substances capable of reducing the unsaturation of the rosinyl ether.

12. The method of treating a "rosinyl" ether which includes contacting the rosinyl ether with a palladium catalyst at a temperature within the range of about 150° C. to about 250° C. in the absence of added substances capable of reducing the unsaturation of the rosinyl ether.

13. The method of treating a "rosinyl" ether which includes contacting the rosinyl ether with a catalyst consisting of palladium black supported on granular alumina at a temperature within the range of about 150° C. to 250° C. in the absence of added substances capable of reducing the unsaturation of the rosinyl ether.

14. A product formed by treating abietyl methyl ether with a hydrogenation catalyst in the absence of added substances capable of reducing the unsaturation of the material under the conditions of treatment, said product being characterized by the fact that it has a lesser degree of unsaturation than the abietyl methyl ether from which it was formed.

15. A product formed by treating abietyl ethyl ether with a hydrogenation catalyst in the absence of added substances capable of reducing the unsaturation of the material under the conditions of treatment, said product being characterized by the fact that it has a lesser degree of unsaturation than the abietyl ethyl ether from which it was formed.

16. A product formed by treating abietyl butyl ether with a hydrogenation catalyst in the absence of added substances capable of reducing the unsaturation of the material under the conditions of treatment, said product being characterized by the fact that it has a lesser degree of unsaturation than the abietyl butyl ether from which it was formed.

17. The method of treating an abietyl ether which includes contacting the abietyl ether with a hydrogenation catalyst at a temperature within the range of about 150° C. to about 250° C. in the absence of added substances capable of reducing the unsaturation of the abietyl ether.

18. The method of treating an abietyl ether which includes contacting the abietyl ether with a noble metal hydrogenation catalyst at a temperature within the range of about 150° C. to about 250° C. in the absence of added substances capable of reducing the unsaturation of the abietyl ether.

19. The method of treating an abietyl ether which includes contacting the abietyl ether with a catalyst consisting of palladium black supported on granular alumina at a temperature within the range of about 150° C. to about 250° C. in the absence of added substances capable of reducing the unsaturation of the abietyl ether.

EDWIN R. LITTMANN.